Nov. 2, 1954
D. W. HUTCHINSON
2,693,080
DIFFERENTIAL GAS TURBINE
Filed Sept. 13, 1950
7 Sheets-Sheet 1
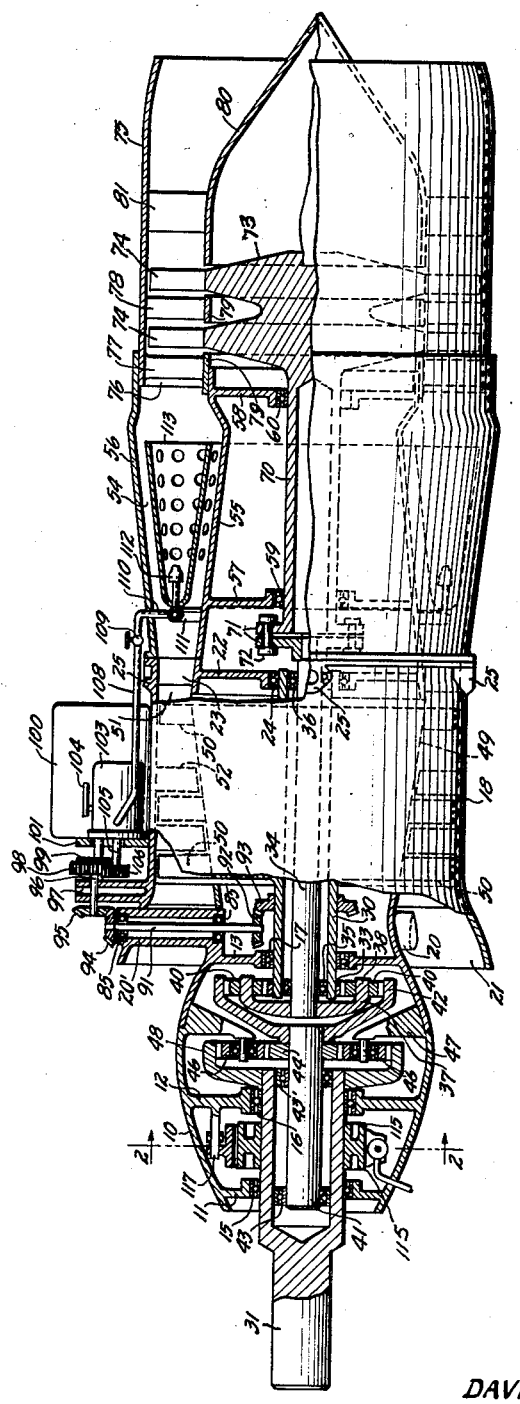
FIG. I.
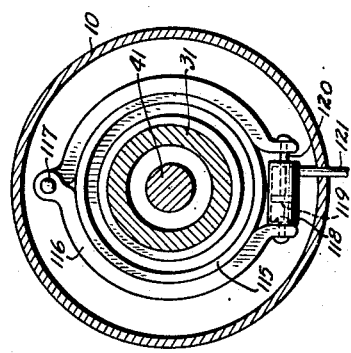
FIG. 2.
Inventor
DAVID W. HUTCHINSON
By
H. P. Kilpatrick
Attorney Nov. 2, 1954 — D. W. HUTCHINSON — 2,693,080
DIFFERENTIAL GAS TURBINE
Filed Sept. 13, 1950 — 7 Sheets-Sheet 2
FIG. 3.
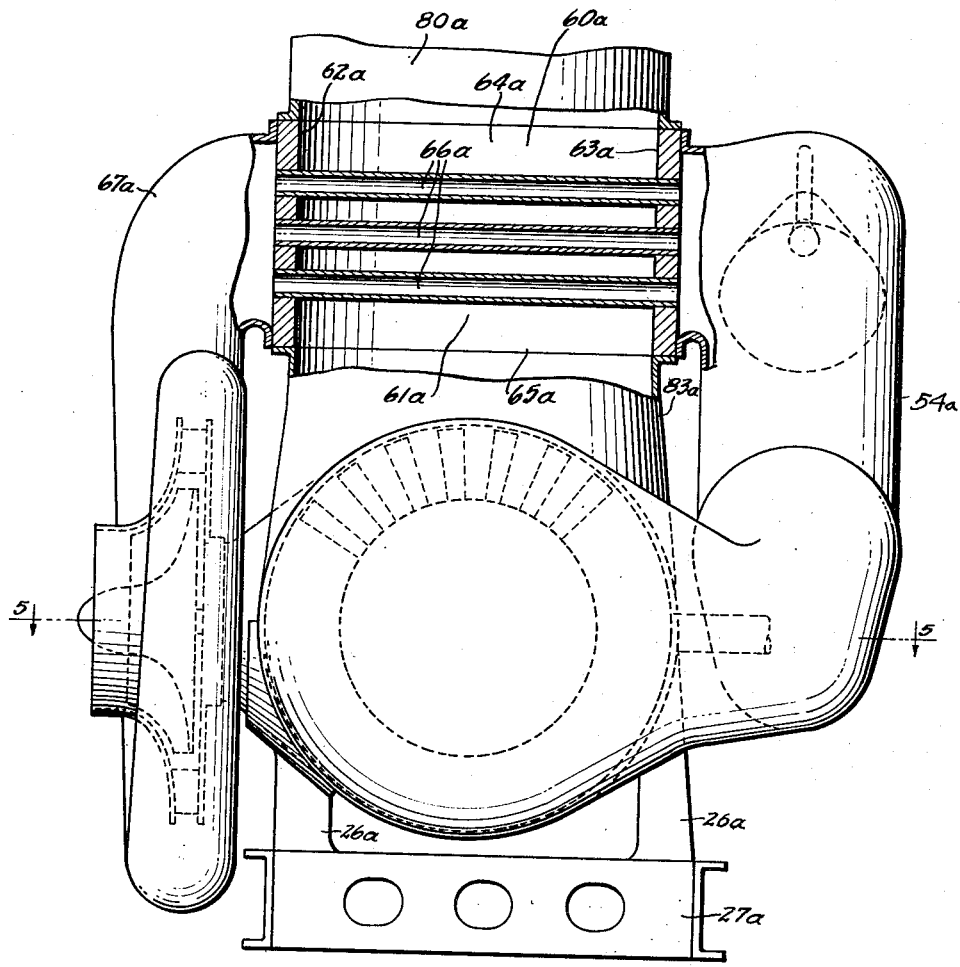
Inventor
DAVID W. HUTCHINSON
Attorney Nov. 2, 1954  D. W. HUTCHINSON  2,693,080
DIFFERENTIAL GAS TURBINE
Filed Sept. 13, 1950  7 Sheets-Sheet 3

Inventor
DAVID W. HUTCHINSON
By H. M. Kilpatrick
Attorney

Inventor
DAVID W. HUTCHINSON

Nov. 2, 1954

D. W. HUTCHINSON 2,693,080

DIFFERENTIAL GAS TURBINE

Filed Sept. 13, 1950

Inventor
DAVID W. HUTCHINSON

By H. M. Kilpatrick

Attorney

Nov. 2, 1954　　　D. W. HUTCHINSON　　　2,693,080
DIFFERENTIAL GAS TURBINE
Filed Sept. 13, 1950　　　7 Sheets-Sheet 7

Inventor
DAVID W. HUTCHINSON
By　H. M. Kilpatrick
Attorney

United States Patent Office 2,693,080
Patented Nov. 2, 1954

2,693,080

DIFFERENTIAL GAS TURBINE

David W. Hutchinson, Mamaroneck, N. Y., assignor to The Turbex Corporation, Mamaroneck, N. Y., a corporation of New York Application September 13, 1950, Serial No. 184,543

13 Claims. (Cl. 60—39.28)

This invention relates to power apparatus, and power apparatus having assisting devices, more particularly to turbines having assisting devices such as open or closed cycle gas turbines wherein air compressors are driven by the turbines to supply air to combustors supplying high pressure, high temperature gases to drive the turbines.

Objects of the invention are to increase the efficiency and reduce the size, weight and cost of such apparatus and to provide an improved turbine apparatus of this kind which provides a powerful easily varied torque to the output shaft when stationary or rotating at high or intermediate speed, and to provide such torque and speed when the turbine and compressor are operating at high speed whereby the efficiency is increased and the size, weight and cost are decreased.

Other objects of the invention are to provide an improved apparatus of this kind which does not require the usual extra torque converter and with which a variable torque may be imparted to the power output shaft at any speed from no speed to maximum speed.

Additional objects of the invention are to effect simplicity and efficiency in such apparatus and to provide a simple apparatus of this kind which is easy to operate and control and is economical, durable, and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a number of gas turbine apparatus, each of which, briefly stated, includes a compressor communicating with and discharging into a combustion chamber having a discharge outlet, and a turbine driven by combustion products from said discharge outlet and having its shaft connected by a differential to the compressor shaft and a power output shaft, whereby the speed of the output shaft may be a function of the difference of the compressor and turbine speeds, whereby the turbine drives the compressor and imparts a torque to said output member, and the turbine and compressor speeds may be varied without varying the output speed, and whereby the output shaft may be stationary with the compressor and turbine rotating at high speed, thereby enabling a variable torque to be imparted to the output shaft at infinitely variable output speeds from standstill to a maximum output member speed.

The expression "differential" or "differential motion" as used herein is used to define differential motions of the general type shown herein wherein three movable parts are differentially connected so that a function of the speed of one part is proportional to a function of the sum of the functions of the speeds of the other two parts, or wherein the parts are so connected that a function of the speed of one part is proportional to a function of the difference of the functions of the speeds of the other two parts.

In the accompanying drawings showing, by way of example, a number of many possible embodiments of the invention, Fig. 1 is a vertical axial sectional view partly in side elevation showing one form of the invention;

Fig. 2 is a sectional view taken on the line 2—2 of Fig. 1;

Figs. 3 and 4 are respectively fragmental side and rear elevations showing another form of the invention;

Figure 4:
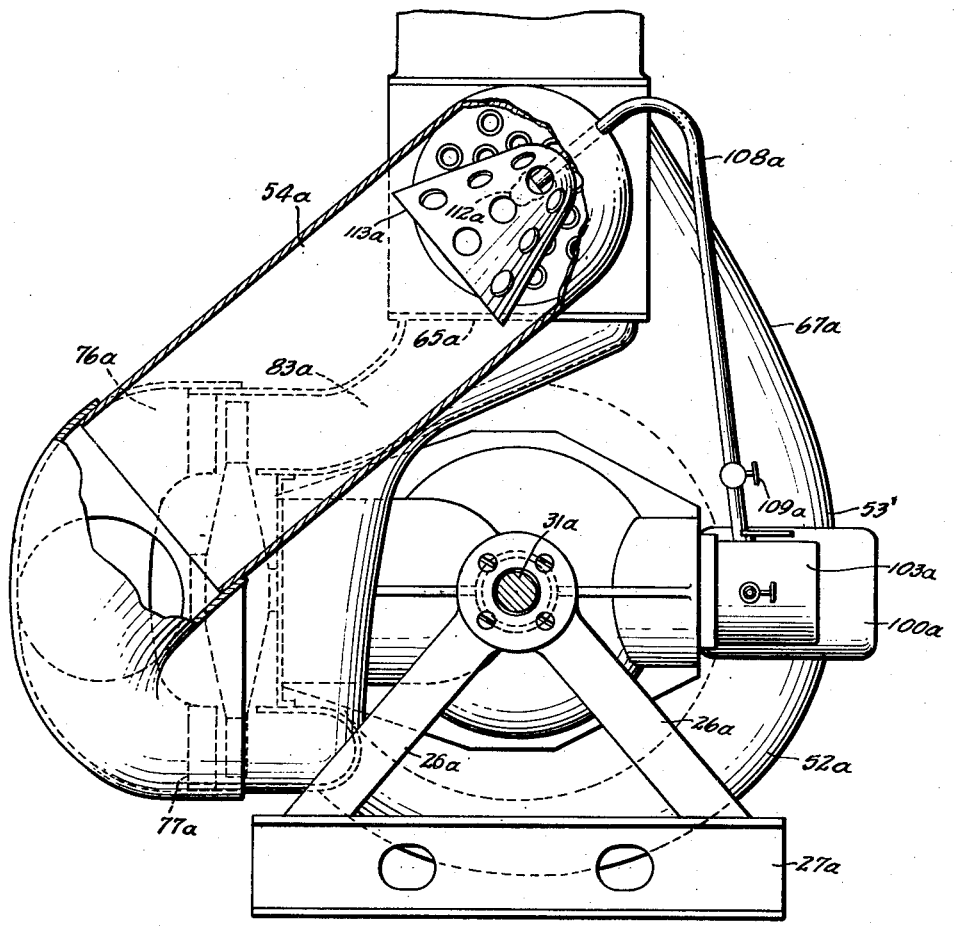

The form of my improved gas turbine apparatus as shown in Fig. 1 comprises a gear housing 10 having spaced transverse partitions 11, 12, 13 carrying horizontally axially alined power output shaft bearings 15, 16, and a compressor shaft bearing 17 therein. A substantially cylindrical compressor casing 18 axially alined with said bearing openings and having its inlet end connected by hollow radial struts 20, 20' to said housing has an open inlet end 21 spaced around and adjacent to the gear housing. A transverse partition 22 carrying radial discharge vanes 23 connected to and in the discharge end of the compressor casing remote from the gear housing has in its center a compressor shaft ball bearing 24 alined with the other bearings. The discharge end of the compressor casing is provided with mounting bosses 25 fast thereon for mounting the apparatus.

A tubular compressor shaft 30 is rotatable in said compressor shaft bearings, and a low speed tubular output shaft 31 is mounted in the output shaft bearings 15, 16. A small spur sun gear 33 is mounted on the inlet end of the compressor shaft; and a turbine rotor-shaft extension 34 in bearings 35, 36 in the compressor shaft carries at the end adjacent to the output shaft a pair of radial arms 37 having bearing spindles 38 parallel to the shafts and carrying rotary thereon axially parallel planet gears 40 meshing with the sun gear 33.

An intermediate speed intermediate shaft 41 in bearings 43, 43' in the output shaft 31 carries fast thereon a large internal sun gear 42 meshing with the planet gears 40. A small spur gear 44 on the intermediate shaft meshes with idlers 46 rotatably mounted on brackets 47 on the inner face of the gear housing wall and meshing with a large internal gear 48 carried on the output shaft 31, whereby the output shaft 31 may be driven at a lower speed than said intermediate shaft 41, and in the opposite direction.

A compressor rotor 49 mounted fast on the compressor shaft 30 in the compressor casing, has on its outer peripheral face stages of peripheral radial inclined rotor propeller blades 50 for forcing air to travel toward and discharge through the inner discharge passage 51 of the compressor casing. The compressor casing has secured fast on its inner face stages of compressor stator blades 52 between the rotor blades 50, and the annular discharge passage 51 at the discharge end receives air from the blades and discharges into an annular burner chamber 54 joining the compressor casing and communicating with the discharge end passage 51 of the compressor casing and extended in a direction away from the compressor casing and having inner and outer walls 55, 56 diverging from each other in said direction. Transverse walls 57, 58 within and joined to the ends of said inner wall are provided with large openings having ball bearings 59, 60 therein receiving a turbine shaft 70 coupled by means of coupling flanges 71 and cushioned bolts 72 to said shaft extension 34 and have a projecting outer end having fast thereon turbine rotor 73 having stages of radial blades 74.

An approximately cylindrical turbine casing 75 fast on said inner and outer burner walls 55, 56 and enclosing the turbine rotor has an annular inlet opening 76 joining and communicating with the burner chamber and carries stages of radial stator nozzle blades 77, 78 mounted fast on the inner face of the turbine casing between the rotor blades and secured to inner rings 79.

A stream lined exhaust cone 80 coaxial with the rotor and pointing away from the rotor is spaced from and connected to the motor housing by relatively thin radial strut blades 81 presenting edges toward the exhausting gases.

The hollow strut 20' mounted radially across the inlet end of the compressor casing has at the opposite ends axially alined bearings 85 axially radial to the inner end of the compressor shaft and receiving an auxiliary power shaft 91 having at its inner end a miter gear 92 meshing with a bevel gear 93 on the compressor shaft.

The outer end of the shaft 91 carries a miter gear 94 meshing with a miter gear 95 on a countershaft 96 rotatably mounted in bearings in a shaft support 97 mounted on the compressor casing. The countershaft carries a spur gear 98, meshing with a gear 99 on the shaft of a starting motor 100 mounted on a plate 101 mounted on the compressor casing.

A variable governor-controlled fuel pump 103 mounted on the plate 101 and having a speed control lever 104 and a drive shaft 105 carrying a gear 106 meshing with said gear 98 of the countershaft supplies fuel to a fuel line 108 having a hand valve 109 therein and having a portion 110 passing into the receiving end of the burner chamber 54 and having an annular portion 111 disposed interiorly around the chamber coaxially thereof and provided with a series of fuel nozzles 112 pointing in the direction of flow and disposed in the narrow end of an annular forwardly open flaring perforated flame holder 113 mounted fast between the inner and outer walls 55, 56.

The pump is so governed that a small increase in speed over the speed for which the governor is set by the lever 104 will cause the pump to feed less fuel to the burners, thus reducing the speed, and maintaining the speed of the compressor practically constant depending upon the setting of the lever 104.

A brake drum 115 mounted fast on the output shaft 31 and having an external peripheral cylindrical braking surface is engaged by two semi-circular brake shoes 116 (Fig. 2) surrounding said brake drum and hingedly mounted at one end on a hinge pin 117 parallel to the output shaft and mounted on the partition 12 of the gear housing.

An hydraulic cylinder 118 fastened to one of said brake shoes and having therein a piston 119 having a piston rod 120 fastened to the other brake shoe is provided with a pressure pipe 121 adapted to be connected to a remotely controlled source of pressure medium, whereby the shaft 31 may be braked or locked.

Rotation of the turbine rotor 73 tends to rotate the compressor rotor 49 in the same direction, and tends when the brake is released, to rotate the intermediate shaft 41 in the direction of the turbine rotor. The power output shaft 31 rotation is in a direction opposite to that of the intermediate shaft 41.

The apparatus of Fig. 1 constitutes a differential gas turbine having the compressor and turbine shafts mutually alined and having a gear box at the end of the alinement and having a power shaft axially alined with the other shafts and disposed at one end while the turbine is at the opposite end. The turbine assembly drives the compressor assembly and imparts a torque to the output member. The turbine and compressor speeds may be varied without varying the output speed, whereby the output shaft may be stationary with the compressor and turbine rotating at high speeds, thereby enabling a variable torque to be imparted to the output shaft 31 at infinitely variable output speeds including standstill and the maximum output member speed.

The brake of Fig. 2 may be applied to the power output shafts of the other species of the invention herein and any of the features shown on any of the species herein may be applied to the other species where suitable.

The apparatus or gas turbine may be started as follows, the output shaft 31 being braked by the brake shoes 116, and the speed control lever 104 set for idling speed. Then the starting motor 100 is energized and brings the compressor and turbine to idling speed, whereupon the valve 109 is operated to admit fuel, combustion is started and the turbine drives the compressor at idling speed. The starting motor is then deenergized.

The brake is then released, and if the torque is not sufficient to move the load on the output shaft 31, the control lever 104 is moved to increase the compressor speed.

The usual gas turbine now in use consists of a compressor, burner and turbine. In order to achieve the high efficiencies necessary for a net power output, the compressor and turbine must rotate at high speeds. These necessary high speeds of the compressor and turbine have heretofore been a handicap in applying the gas turbine power element, when low speeds and high torques are required and particularly when a torque is required with no rotation of the output shaft. The means heretofore employed to fulfill these requirements have been a gas turbine power element, with the compressor and turbine on a single shaft, with the shaft connected through gearing to a generator which is electrically connected to a motor whose output fulfills the above requirements, or a gas turbine power element, with the compressor and turbine on a single shaft, which supplies high pressure, high temperature products of combustion to a second turbine on a separate shaft whose output fulfills the above requirements. Thus in each case some additional means, such as an electric generator and motor or a second turbine is required to provide high torque at low speed.

My herein described gas turbine does not require these additional means, but provides a high torque low speed output or a variable torque with no rotation of the output shaft while the compressor and turbine are both rotating at high speeds.

Thus my turbine eliminates the need for an electric generator and motor or a second turbine and results in a smaller, lighter, less costly apparatus, and has a size, weight, and cost approximately 50% of the generator-motor design, and 70% of the two-turbine design. Since the efficiency of an electric motor or a turbine is poor at low speeds, and is zero at standstill, the elimination of extra requirements results in a reduction in fuel consumption, at standstill and very low speeds, of 60% or more of the fuel consumption of the generator-motor and two-turbine designs. At full load my design shows a fuel saving of 6% or more.

Figure 5:
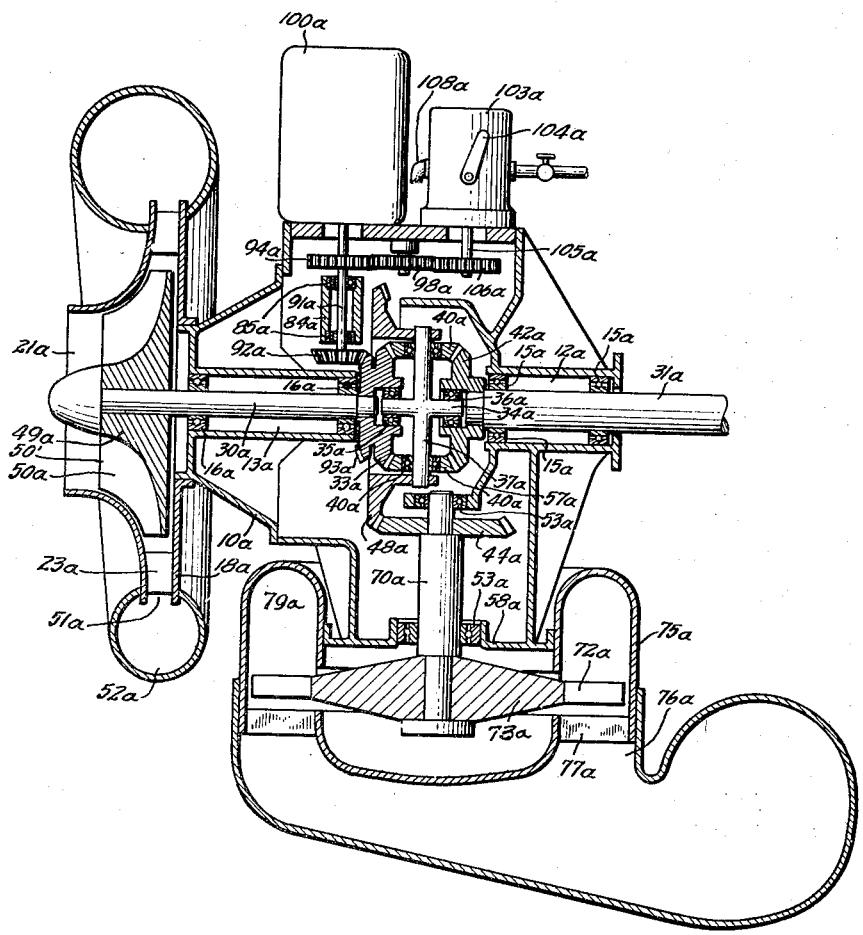
Fig. 5 is a horizontal axial sectional view taken on the line 5—5 of Fig. 3, parts being omitted.

The gas turbine apparatus of Figs. 3 to 5 comprises a gear housing 10a to which is secured a compressor casing 18a. The gear housing has horizontally alined power output and compressor shaft bearing housings 12a, 13a each having ball bearings 15a, 16a at each end in which are disposed a compressor shaft 30a and a power output shaft 31a. The gear housing is supported by standards 26a carried on a base 27a.

Miter sun gears 33a, 42a fast on the adjacent ends of the respective shafts 30a, 31a have in their adjacent faces axially alined bearing openings containing ball bearings 35a, 36a receiving a differential shaft 34a having fast thereon diametrically opposite radial arms 37a rotatably carrying miter planet gears 40a meshing with the sun gears 33a, 42a. Said housing 10a has mounted therein partitions 57a, 58a in which are mounted horizontally axially alined ball bearings 53a, radial to said differential shaft 34a and receiving a turbine shaft 70a carrying a radial blade turbine rotor 73a fast on its outer end and fast near its inner end a miter gear 44a meshing with a differential bevel drive gear 48a mounted fast on the outer ends of said arms 37a coaxial with said shafts 30a, 31a, 34a, thereby to drive the compressor shaft 30a and usually the power output shaft 31a when the turbine rotor 73a is driven.

A centrifugal compressor impeller rotor 49a mounted fast on the outer end of the compressor shaft 30a has in its outer face curved tapering passages 50a having large inner inlet ends 50' and tapering toward and discharging through the periphery of the rotor. Said compressor casing 18a conformably enclosing the rotor has a large inlet opening 21a adjacent to said inlet ends 50' and a peripheral discharge passage 51a and spaced stator guide vanes 23a mounted across said peripheral discharge passage, and a circumferential volute passage 52a around and communicating with the peripheral passage 51a and gradually increasing in cross-section to the discharge end 53' (Fig. 4).

A regenerator heat exchanger 60a disposed above the gear housing comprises a chamber 61a having end walls 62a, 63a and top and bottom openings 64a, 65a and a group of open-ended heat exchange tubes 66a parallel with the compressor shaft and extending through said end walls. A conduit 67a extending from and communicating with the discharge end 53' of said volute passage 52a and extending to and joining the end walls 62a, communicates with and surrounds the adjacent ends of the group of tubes 66a.

A burner combustion chamber 54a joining the other end wall 63a around and communicating with the other ends of the tubes 66a extends downwardly to near the outer face of the radial turbine blades 72a mounted fast to periphery of the rotor 73a, and discharges into a turbine casing 75a fast on the gear housing and enclosing the turbine rotor 73a and having an annular inlet opening 76a joining and communicating with the burner chamber 54a at the outer side of the rotor blades across which inlet opening radial stator nozzle blades 77a are mounted fast. The turbine casing 75a has at the inner side of the rotor blades and surrounding the turbine shaft, an annular discharge passage 79a discharging into a conduit 83a extending to, joining and communicating with the bottom opening 65a of the heat exchanger whereby exhaust from the turbine heats said tubes 66a, and air passing therethrough is exhausted through an exhaust duct 80a communicating with said top opening 64a.

A bearing bracket 84a mounted in the gear housing has therein a set of axially alined bearings 85a radial to the inner end of the compressor shaft and receiving an auxiliary power shaft 91a joined at its outer end to the shaft of a starting motor 100a and having a spur gear 94a near its outer end, and on the inner end a miter gear 92a meshing with a bevel gear 93a fast on sun gear 33a of the compressor shaft 30a. An idler 98a mounted on a shaft 96a mounted on the gear housing wall engages with said spur gear 94a; and a variable governor-controlled fuel pump 103a mounted on the gear housing has a speed control lever 104a and a drive shaft 105a carrying a gear 106a meshing with said idler 98a.

Said pump 103a supplies fuel to a fuel line 108a having a valve 109a therein passing from said pump into the upper end of the burner chamber 54a coaxially thereof and provided at its end with a fuel nozzle 112a surrounded by a perforated flame holder 113a mounted in the chamber around the fuel line and having a wide open end and directed toward the discharge end 76a of the combustion chamber.

A brake as in Fig. 1 could be applied to the output shaft 31a or an extension thereof, and the operation of the apparatus of Figs. 3 to 5 may be similar to that of Fig. 1. The apparatus of Figs. 3 to 5 constitutes a differential gas turbine and a regenerator having the compressor and turbine shafts 30a, 70a mutually perpendicular and having the gear box 10a at their intersection and having a power shaft 31a axially alined with the compressor shaft 30a. The turbine 73a drives the compressor and imparts a torque to said output shaft 31a, and the turbine and compressor speeds may be varied without varying the output speed. Thus the output shaft may be held stationary while the compressor and turbine rotate at high speeds. This allows a variable torque to be imparted to the output shaft at infinitely variable output shaft speeds from standstill to the maximum output shaft speed.

Figure 6:
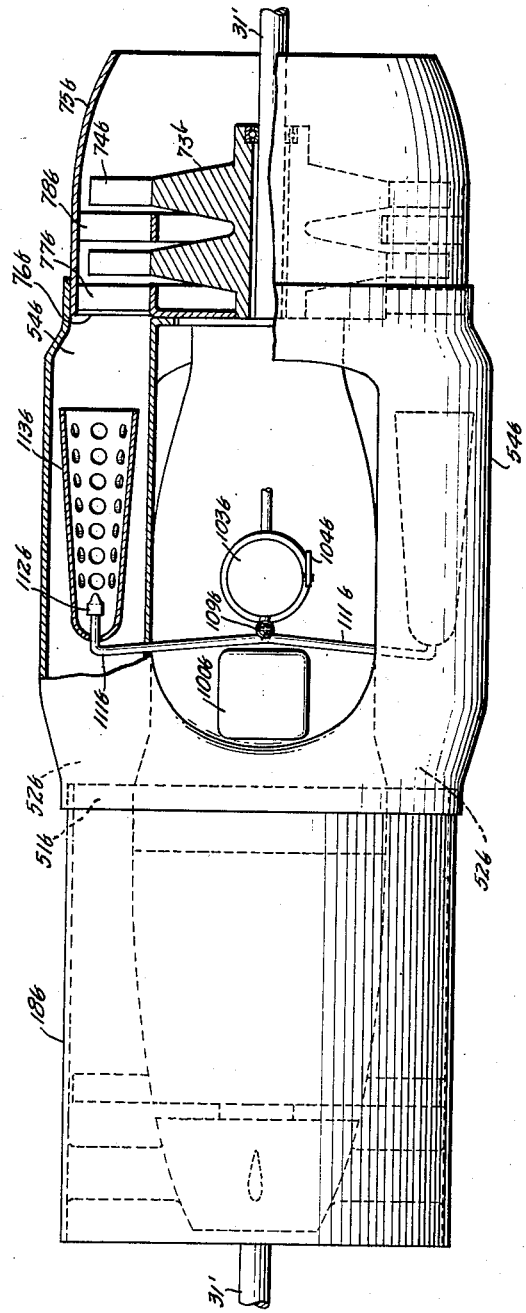
Fig. 6 is a plan partly in horizontal section showing still another form of the invention.
Figure 7:
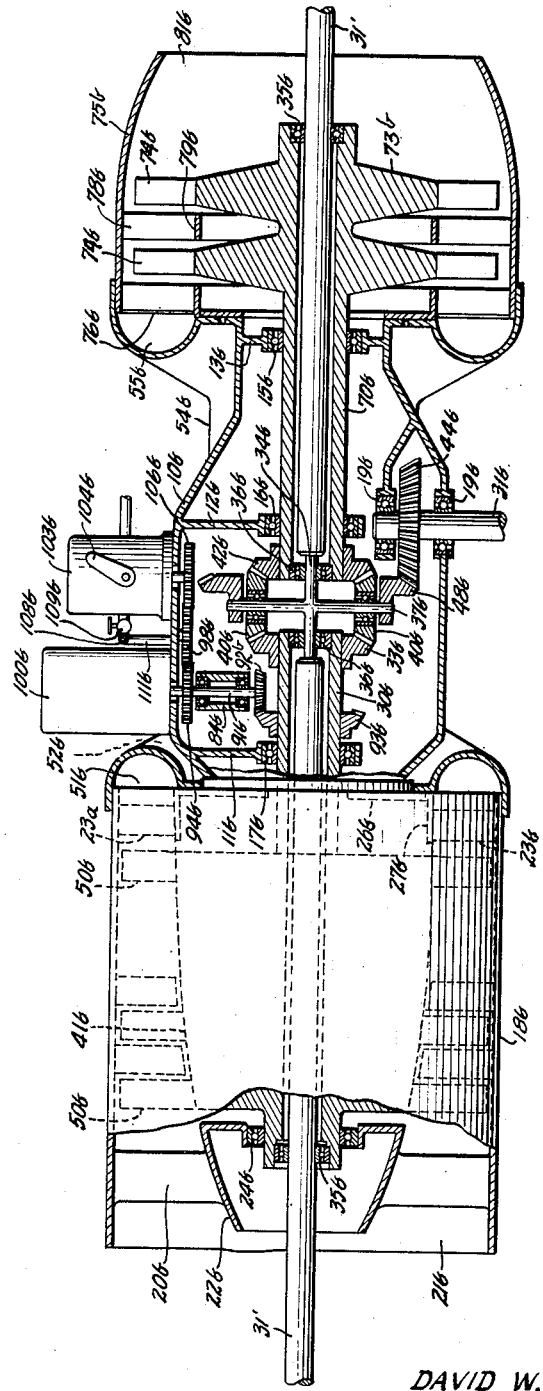
Fig. 7 is a vertical axial sectional view partly in side elevation of a differential gas turbine of Fig. 6.

My improved gas turbine apparatus, as shown in Figs. 6 and 7 includes a gear housing 10b having transverse partitions 11b, 12b, 13b carrying horizontally alined turbine shaft ball bearings 15b, 16b and compressor shaft bearing 17b therein. A cylindrical compressor casing 18b axially alined with said openings has in its inner end a transverse partition 26b mounted fast to the housing 10b and having a peripheral flange 27b carrying radial discharge guide vanes 23b. Said casing has an open outer end in which is disposed a spider 20b, 22b having spaced struts 20b joining the casing and having a hub 22b carrying therein a ball bearing 24b alined with the other bearings. Tubular compressor and turbine shafts 30b and 70b rotatable in said bearings have ball gearings 35b, 36b in their ends and carry miter sun gears 33b, 42b mounted fast on their adjacent ends. A differential shaft 34b in said bearings 36b of the said adjacent ends has fast thereon diametrically opposite radial arms 37b rotatably carrying miter planet gears 40b meshing with the sun gears 33b, 42b. Longitudinal power output shafts 31', 31' in the outer-end bearings 35b of the tubular shafts and projecting at the outer ends are secured fast on the inner ends to said differential shaft 34b.

A differential bevel drive gear 48b is mounted fast on the outer ends of said arms coaxial with said shafts. Said housing is provided with axially alined bearings 19b radial to said differential shaft and carrying a radial power output shaft 31b projecting at the outer end and carrying fast near its inner end a miter gear 44b meshing with said drive gear 48b. Any one or two of the output shafts 31', 31', 31b may be omitted if desired.

A multi-stage compressor rotor 41b mounted fast on the compressor shaft 30b in the casing 18b has fast on its outer peripheral face stages of peripheral inclined radial propeller blades 50b for forcing air to travel toward and discharge through the annular discharge opening 51b at the inner end of the compressor casing.

A pair of burner chambers 54b at opposite sides of the outer face of the gear housing 10b substantially parallel to the differential shaft 34b join, communicate with and receive air from a common annular passage chamber 52b mounted fast to the inner end of the compressor casing and receiving air from the compressor casing. The burner chambers join and discharge into an annular passage chamber 55b.

The turbine rotor 73b on the outer end of the turbine shaft 70b has stages of radial blades 74b disposed in an approximately cylindrical turbine casing 75b fast on the gear housing and having a large exhaust opening 81b and an annular inlet opening 76b joining and communicating with the discharge chamber 55b and across which stationary nozzle blades 77b are disposed. Radial stator turbine blades 78b are mounted fast on the inner face of the turbine casing between the stages of rotor blades 74b and join an inner ring 79b.

A bearing bracket 84b mounted in the gear housing has therein a set of axially alined bearings axially radial to the inner end of the compressor shaft and receiving an auxiliary power shaft 91b joined to a shaft of a starting motor 100b at its outer end and having a miter gear 92b on its inner end meshing with a bevel gear 93b fast on the compressor shaft. A variable governor-controlled fuel pump 103b mounted on the gear housing 10b and having a speed control lever 104b and a drive shaft carrying a gear 106b meshing with an idler 98b meshing with a spur gear 94a mounted fast near the outer end of the auxiliary shaft 91b supplies fuel to a fuel line 108b from said pump having a valve 109b and branches 111b passing into the receiving end of the respective burner chambers 54b coaxially thereof and each provided at the end with a fuel nozzle 112b disposed in a forwardly open flaring perforated flame holder 113b mounted in the combustion chamber.

Any one or two of the output shafts 31', 31', 31b may be omitted if desired, and any one or more or all of these shafts may be provided with braking means similar to that of Fig. 2.

Rotation of the turbine rotor 73b tends to rotate the compressor rotor in the opposite direction, and tends to rotate in the direction of the turbine rotor the longitudinal power output shafts and tends to rotate the gear 48b in the same direction of the turbine rotor and rotate the radial power output shaft.

The operation of the apparatus of Figs. 6 and 7 will be understood from the operation of the apparatus of Figs. 1 and 2.

The turbine 73b drives the compressor and also imparts a torque to any or all of said output shafts; whereby the turbine and compressor speeds may be varied without varying the output speed. Thus the output shafts may be stationary while the compressor and turbine rotate at high speeds. This allows a variable torque to be imparted to the output shaft at infinitely variable output speeds from standstill to the maximum output shaft speed.

Figure 8:
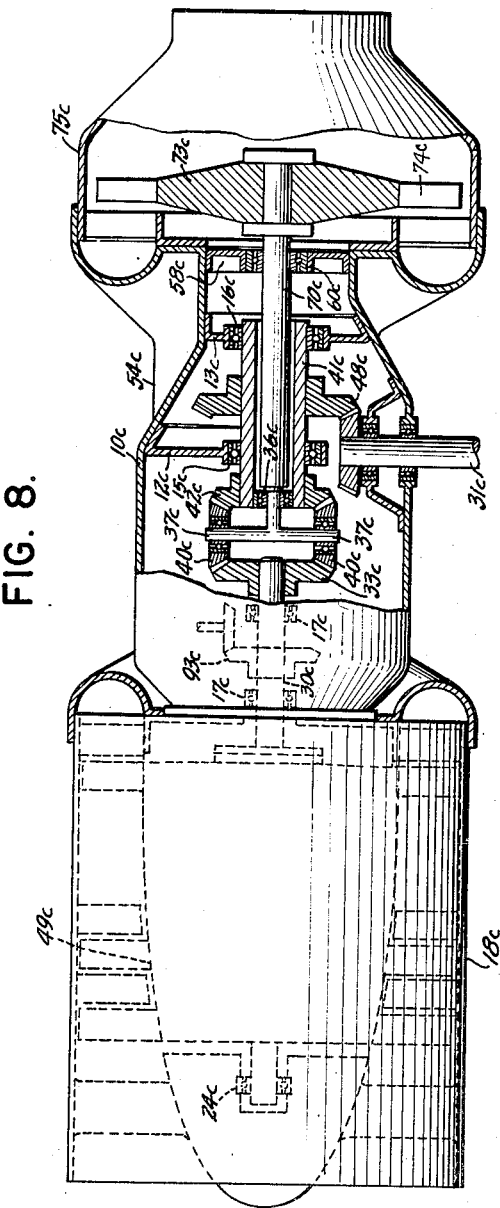
Figs. 8 and 9 are fragmental side elevations partly in section showing modifications of the differential gas turbine of Fig. 6.

In gas turbine apparatus of Fig. 8, the gear housing 10c similar to that of Fig. 6 has partitions 12c, 13c carrying horizontally alined large tubular shaft bearings 15c, 16c receiving a tubular shaft 41c having a ball bearing 36c in the inner end, and the compressor shaft 30c is rotary in the compressor shaft bearings 17c, 24c.

A turbine shaft 70c rotary in a turbine shaft bearing 60c mounted on a partition 58c in the housing, and the bearing 36c of the tubular shaft has fast thereon adjacent to the compressor shaft, diametrically opposite radial arms 37c rotatably carrying miter planet gears 40c meshing with the sun gears 33c, 42c on the adjacent ends of the tubular and compressor shafts. A differential bevel drive gear 48c mounted fast on the tubular shaft 41c is operatively connected to drive a radial power output shaft 31c as in Fig. 7.

A compressor rotor 49c on the compressor shaft 30c in the compressor casing 18c forces air into a pair of burner chambers 54c discharging as in Fig. 7 against blades 74c of a single stage turbine rotor 73c fast on the outer end of the turbine shaft 70c in the approximately cylindrical turbine casing 75c fast on the gear housing.

A bevel gear 93c on the compressor shaft 30c is operatively connected to the starting motor and fuel pump as in Fig. 1.

Rotation of the turbine rotor 73c tends to rotate the compressor rotor 49c in the same direction and tends to rotate the tubular shaft 41c in the direction of the turbine rotor. Rotation of the tubular shaft 41c rotates the power take-off shaft 31c at greater speed than the speed of the tubular shaft.

Figure 9:
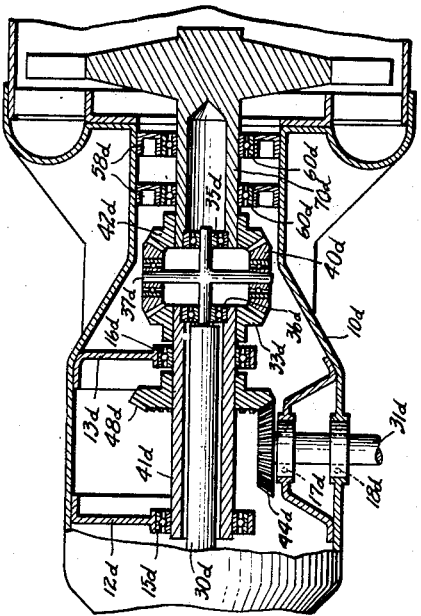

The apparatus of Fig. 9 comprises a gear housing 10d having partitions 12d, 13d carrying horizontally alined tubular shaft bearings 15d, 16d receiving a tubular shaft 41d. A tubular turbine shaft 70d rotary in the bearings 60d on partitions 58d has a ball bearing 35d in the end adjacent to the tubular shaft 41d. Miter sun gears 33d, 42d are mounted fast on the adjacent ends of the tubular shaft and the turbine shaft. A compressor shaft 30d rotary in bearings 36d in the tubular shaft and bearings 35d in the turbine shaft has fast thereon opposite radial arms 37d rotatably carrying miter planet gears 40d meshing with the sun gears 33d, and 42d on the tubular and turbine shafts.

A radial power output shaft 31d in bearings 17d, 18d and projecting at its outer end carries fast near its inner end a miter gear 44d meshing with a drive gear 48d fast on the tubular shaft 41d.

Rotation of the turbine rotor tends to rotate the compressor shaft 30d in the same direction and tends to rotate the tubular shaft 41d in the opposite direction from the turbine rotor and rotate output shaft 31d.

The turbine apparatus of Figs. 6 to 9 constitutes differential gas turbines having compressor and turbine shafts mutually alined and having a gear box therebetween and having power output shafts perpendicular to the axis of the other shafts. Fig. 7 also shows power output shafts alined with the turbine and compressor shafts. As in the other figures the turbine assembly drives the compressor assembly and imparts a torque to said output member and allows the turbine and compressor speeds to be varied without varying the output speed, whereby the output shaft may be stationary with the compressor and turbine rotating at high speed, thereby enabling a variable torque to be imparted to the output member at infinitely variable output member speeds from standstill to the maximum output shaft speed.

Any of the output shafts herein may be provided with breaking means as in Fig. 2 herein, and the operation of all of the species will be obvious in view of the described operation of the apparatus of Figs. 1 and 2. A desired species may be provided with a regenerator of the general type of the regenerator 60 of Fig. 4.

The motors 100 in all of the species may be used to assist driving the compressor at any time during operation, and may be any type of power means.

I claim as my invention:

1. A gas turbine apparatus comprising a gear housing; a compressor casing alined with said housing and having an inlet end adjacent thereto and a discharge end remote therefrom; a tubular compressor shaft rotatable axially of said casing, a low speed tubular output shaft rotatable in and projecting from the housing and alined with the tubular shaft; a sun gear on the compressor shaft near the output shaft; a turbine shaft extension rotary in the compressor shaft and carrying arms having bearing spindles parallel to the shafts; planet gears on said spindles meshing with the sun gears; an intermediate shaft rotary in the output shaft and carrying an internal gear meshing with the planet gears; a small spur gear on the intermediate shaft; fixed brackets in the gear housing, axially parallel idlers on said brackets meshing with said spur gear; an internal gear on the output shaft meshing with the idlers; a compressor rotor on the compressor shaft and having propeller blades in the compressor casing; an annular burner chamber joining said discharge end coaxial with said shafts; a turbine shaft rotatably mounted coaxially of said chamber and coupled to said extension; a turbine rotor on the outer end of the turbine shaft; and a turbine casing enclosing the turbine rotor and having an annular inlet opening communicating with said chamber, and a settable speed-controlled fuel feed means driven by the compressor for automatically feeding fuel to said chamber inversely as compressor speed changes, thereby maintaining substantially constant compressor speed and torque independently of output shaft speed.

2. A gas turbine apparatus comprising a gear housing; a power output shaft and a compressor shaft alined therewith rotatably mounted in said housing; sun gears fast on adjacent ends of the shafts and having adjacent axially alined bearings; a differential shaft in said bearings and having opposite radial arms carrying planet gears meshing with the sun gears; a drive gear fast on said arms coaxial with said shafts; a turbine shaft rotatably mounted in said housing carrying fast thereon a turbine rotor; and a miter gear meshing with said drive gear; a centrifugal compressor impeller rotor fast on the compressor shaft; a compressor casing enclosing the compressor rotor and having a discharge passage; a regenerator heat exchanger chamber having end walls and top and bottom openings, and a group of heat exchange tubes extending across the chamber and through said end walls; a conduit from and communicating with the discharge end of said discharge passage and communicating with one end of the group of tubes; a combustion chamber communicating with the other end of the tubes; and a turbine casing enclosing the turbine rotor and having an inlet opening communicating with the burner chamber and having a discharge passage communicating with said bottom opening of the heat exchanger; and a settable speed-controlled fuel feed means driven by the compressor for automatically feeding fuel to said chamber inversely as compressor speed changes, thereby maintaining substantially constant compressor speed and torque independently of output shaft speed.

3. A gas turbine apparatus comprising a gear housing; a cylindrical compressor casing joined to said housing; alined tubular turbine and compressor shafts rotatably mounted in said housing and casing, respectively; sun gears on adjacent ends of the shafts and having bearings coaxially therein; a differential shaft in said bearings carrying arms carrying planet gears meshing with the sun gears; a drive gear on the outer ends of said arms coaxial with said shafts; a power outlet shaft rotary in said housing and carrying a miter gear meshing with said drive gear; power output shafts rotatable in and projecting from the tubular shafts and joined to said differential shaft; a compressor rotor fast on the compressor shaft in the compressor casing; burner chambers communicating with said compressor casing; a turbine rotor on the turbine shaft; and a casing enclosing the turbine rotor and having a nozzle chamber discharging against rotor blades and communicating with the burner chambers; and a settable speed-controlled fuel feed means driven by the compressor for automatically feeding fuel to said chambers inversely as compressor speed changes, thereby maintaining substantially constant compressor speed and torque independently of output shaft speed.

4. A gas turbine apparatus comprising a gear housing; a compressor casing joined to said housing; tubular shaft in said housing, and having a bearing in its inner end; a turbine shaft bearing in the housing axially alined with the tubular shaft near its outer end; a compressor shaft and a rotor thereon rotary in the compressor casing and alined with the tubular shaft; sun gears fast on the adjacent ends of the tubular and compressor shafts; a turbine shaft rotary in said turbine bearing and the bearing in the tubular shaft and having fast thereon, adjacent to the compressor shafts, opposite radial arms carrying planet gears meshing with the sun gears; a miter drive gear fast on the tubular shaft, and a power outlet shaft rotatable in the housing radial to the tubular shaft and carrying a miter gear meshing with said drive gear; a combustion chamber discharging into the turbine and into which the compressor discharges; and a settable speed-controlled fuel feed means driven by the compressor for automatically feeding fuel to said chamber inversely as compressor speed changes, thereby maintaining substantially constant compressor speed and torque independently of output shaft speed.

5. A gas turbine apparatus comprising a gear housing; a compressor casing joined to and alined with said housing; a tubular shaft rotary in said housing longitudinally thereof and having a bearing in its end remote from said casing; a tubular turbine shaft rotary in the housing and alined with the tubular shaft and having a coaxial bearing adjacent to the tubular shaft; sun gears fast on the the adjacent ends of the tubular shafts; and a compressor shaft rotary in said compressor casing and said tubular shaft and having fast thereon opposite radial arms carrying planet gears meshing with the sun gears; a compressor rotor in the compressor casing on the compressor shaft; a miter drive gear fast on the tubular shaft; and a power outlet shaft rotatable in the housing radial to the tubular shaft and carrying a miter gear meshing with said drive gear; a combustion chamber discharging into the turbine and into which the compressor discharges; and a settable speed-controlled fuel feed means driven by the compressor for automatically feeding fuel to said chamber inversely as compressor speed changes, thereby maintaining substantially constant compressor speed and torque independently of output shaft speed.

6. In combination, a combustion chamber; a compressor discharging into the combustion chamber; a turbine driven by products of combustion from the combustion chamber; an output shaft; a differential differentially connecting the turbine, the compressor and the output shaft; and means to vary the fuel flow to the combustion chamber in response to variations in the compressor speed.

7. In combination, a combustion chamber; a compressor discharging into the combustion chamber; a turbine driven by products of combustion from the combustion chamber; an output shaft; a differential differentially connecting the turbine, the compressor and the output shaft; and means to control and supply fuel to the combustion chamber in amounts to maintain constant compressor speed.

8. In combination, a combustion chamber; a compressor discharging into the combustion chamber; a turbine driven by products of combustion from the combustion chamber; an output shaft; a differential differentially connecting the turbine, the compressor and the output shaft; and means to control and supply fuel to the combustion chamber in amounts to maintain a relatively constant output torque over a wide range of output speeds.

9. In combination, a combustion chamber; a compressor discharging into the combustion chamber; a turbine driven by products of combustion from the combustion chamber; an output shaft; a differential differentially connecting the turbine, the compressor and the output shaft; and means to control and supply fuel to the combustion chamber in amounts to maintain the compressor speed constant and to allow the turbine speed to vary greatly providing both positive and negative output speed.

10. In combination, a combustion chamber; a compressor discharging into the combustion chamber; a turbine driven by products of combustion from the combustion chamber; an output shaft; a differential differentially connecting the turbine, the compressor and the output shaft; a means controlled by the compressor to control and supply fuel to the combustion chamber in amounts to maintain constant compressor speed.

11. In combination, a combustion chamber; a compressor discharging into the combustion chamber; a turbine driven by products of combustion from the combustion chamber; an output shaft; a differential differentially connecting the turbine, the compressor and the output shaft; and a settable speed-controlled fuel feed means driven by the compressor for automatically feeding fuel to said chamber inversely as compressor speed changes, thereby maintaining substantially constant compressor speed and torque independently of output shaft speed; whereby constant compressor speed may be maintained while the turbine speed may greatly vary while providing substantially constant output shaft torque at standstill and positive and negative output shaft speeds and output power substantially proportional to output shaft speed, said fuel feed means being constructed to provide a maximum fuel flow substantially proportional to the compressor speed and therefore the air flow, thereby maintaining a maximum turbine inlet temperature independent of compressor speed and preventing overheating of the turbine.

12. In combination, a combustion chamber having a discharge outlet; a compressor communicating with and discharging into the combustion chamber and having a compressor shaft and a rotor thereon having blades fixed on the rotor; a turbine having a turbine shaft separate from the compressor shaft and carrying a rotor driven by combustion products from the discharge outlet of said chamber; a power output shaft separate from the other shafts adapted to drive a load; a differential forming an operative connection between the shafts and having three separately movable differentially connected movable elements operatively connected to said shafts respectively for causing the turbine shaft to apply torque to the compressor and output shafts; means to control and supply fuel to the chamber to maintain constant compressor speed; said means comprising a settable speed-controlled fuel feed means driven by the compressor shaft for automatically metering the fuel flow and feeding fuel to the combustion chamber inversely as compressor shaft speed changes, thereby maintaining substantially constant compressor shaft speed and torque independently of output shaft speed.

13. In combination, a combustion chamber having a discharge outlet; a single compressor communicating with and discharging into the combustion chamber and having a single compressor shaft and a rotor thereon having blades fixed on the rotor; a turbine having a turbine shaft separate from the compressor shaft and carrying a rotor driven by combustion products from the discharge outlet of said chamber; a power output shaft separate from the other shafts adapted to drive a load; a differential forming an operative connection between the shafts and having three separately movable differentially connected movable elements operatively connected to said shafts respectively for causing the turbine shaft to apply torque to the compressor and output shafts; means to control and supply fuel to the chamber to maintain constant compressor speed; said means comprising a settable speed-controlled fuel feed means driven by the compressor shaft for automatically metering the fuel flow and feeding fuel to the combustion chamber inversely as compressor shaft speed changes, thereby maintaining substantially constant compressor shaft speed and torque independently of output shaft speed; whereby constant compressor shaft speed is maintained while the turbine shaft speed may greatly vary while providing substantially constant output shaft torque at standstill and positive and negative output shaft speeds and output power substantially proportional to output shaft speed, said fuel feed means being constructed to provide a maximum fuel flow substantially proportional to the compressor speed and therefore the air flow, thereby maintaining a maximum turbine inlet temperature independent of compressor speed and preventing overheating of the turbine.

References Cited in the file of this patent

UNITED STATES PATENTS

| Number | Name | Date |
|---|---|---|
| 2,358,815 | Lysholm | Sept. 26, 1944 |
| 2,423,183 | Forsyth | July 1, 1947 |
| 2,514,513 | Price | July 11, 1950 |
| 2,575,683 | Price | Nov. 20, 1951 |

FOREIGN PATENTS

| Number | Country | Date |
|---|---|---|
| 418,794 | France | Oct. 10, 1910 |
| 595,357 | Great Britain | Dec. 3, 1947 |